(12) United States Patent
Ballard

(10) Patent No.: US 7,727,938 B2
(45) Date of Patent: Jun. 1, 2010

(54) NON-AQUEOUS GELS FOR CONSOLIDATING AND STABILIZING WELLBORE FORMATIONS

(75) Inventor: David Antony Ballard, Aberdeenshire (GB)

(73) Assignee: M-I L.L.C., Houston, TX (US)

( * ) Notice: Subject to any disclaimer, the term of this patent is extended or adjusted under 35 U.S.C. 154(b) by 412 days.

(21) Appl. No.: 11/760,524

(22) Filed: Jun. 8, 2007

(65) Prior Publication Data

US 2007/0287767 A1   Dec. 13, 2007

Related U.S. Application Data

(60) Provisional application No. 60/804,349, filed on Jun. 9, 2006.

(51) Int. Cl.
C09K 8/524 (2006.01)
C09K 8/60 (2006.01)
C09K 8/00 (2006.01)

(52) U.S. Cl. ............. 507/218; 507/219; 507/248; 523/130

(58) Field of Classification Search ............. 507/218, 507/219, 248; 523/130; 516/905, 917
See application file for complete search history.

(56) References Cited

U.S. PATENT DOCUMENTS

| | | | | |
|---|---|---|---|---|
| 2,909,494 | A * | 10/1959 | Parry et al. ............ | 528/111.3 |
| 3,250,330 | A | 5/1966 | Smith, Jr. | |
| 4,127,173 | A * | 11/1978 | Watkins et al. .......... | 166/276 |
| 5,160,642 | A | 11/1992 | Schield et al. | |
| 5,381,864 | A | 1/1995 | Nguyen et al. | |
| 5,945,386 | A | 8/1999 | Alonso-DeBolt et al. | |
| 6,194,490 | B1 | 2/2001 | Roth et al. | |
| 6,548,189 | B1 * | 4/2003 | Gunasekaran et al. ....... | 428/626 |
| 6,787,507 | B1 | 9/2004 | Coveney et al. | |
| 2005/0020735 | A1 | 1/2005 | Krappe et al. | |
| 2005/0288456 | A1 | 12/2005 | Morkunas et al. | |

FOREIGN PATENT DOCUMENTS

WO    2007143749 A1    12/2007

OTHER PUBLICATIONS

PCT International Search Report issued in International Application No. PCT/US2007/070855 dated Nov. 14, 2007 (3 pages).
PCT Written Opinion issued in International Application No. PCT/US2007/070855 dated Nov. 14, 2007 (4 pages).
Supplementary European Search Report issued in European Application No. EP 07 798 370.8; dated Mar. 4, 2010 (11 pages).

* cited by examiner

*Primary Examiner*—Timothy J. Kugel
*Assistant Examiner*—Aiqun Li
(74) *Attorney, Agent, or Firm*—Osha • Liang LLP

(57) ABSTRACT

A method of treating an earth formation that includes injecting at least one lipophilic monomer into the earthen formation; wherein the at least one lipophilic monomer is selected from epoxide-functionalized derivative of soybean oil, linseed oil, rapeseed oil, cashew nut shell oil; perilla oil, tung oil, oiticia oil, safflower oil, poppy oil, hemp oil, cottonseed oil, sunflower oil, high-oleic triglycerides, triglycerides of euphorbia plants, peanut oil, olive oil, olive kernel oil, almond oil, kapok oil, hazelnut oil, apricot kernel oil, beechnut oil, lupine oil, maize oil, sesame oil, grapeseed oil, lallemantia oil, castor oil, herring oil, sardine oil, menhaden oil, whale oil, and tall oil, injecting at least one crosslinking agent into the earthen formation; wherein the at least one crosslinking agent comprises at least one primary amine; and allowing the lipophilic monomer and the crosslinking agent to react in the earth formation is disclosed.

26 Claims, No Drawings

NON-AQUEOUS GELS FOR CONSOLIDATING AND STABILIZING WELLBORE FORMATIONS

CROSS-REFERENCE TO RELATED APPLICATIONS

This application claims priority under 35 U.S.C. §119(e) to U.S. Provisional Patent Application No. 60/804,349, filed Jun. 9, 2006, the disclosure of which is incorporated herein by reference.

BACKGROUND OF INVENTION

1. Field of the Invention

The present disclosure relates generally to methods for improving wellbore strength, and more particularly, to methods to consolidate and stabilize the wellbore.

2. Background Art

Lost circulation is a recurring drilling problem, characterized by loss of drilling mud into downhole formations that are fractured, highly permeable, porous, cavernous, or vugular. These earth formations can include shale, sands, gravel, shell beds, reef deposits, limestone, dolomite, and chalk, among others. Other problems encountered while drilling and producing oil and gas include stuck pipe, hole collapse, loss of well control, and loss of or decreased production.

Induced mud losses may also occur when the mud weight, required for well control and to maintain a stable wellbore, exceeds the fracture resistance of the formations. A particularly challenging situation arises in depleted reservoirs, in which the drop in pore pressure weakens hydrocarbon-bearing rocks, but neighboring or inter-bedded low permeability rocks, such as shales, maintain their pore pressure. This can make the drilling of certain depleted zones impossible because the mud weight required to support the shale exceeds the fracture resistance of the sands and silts.

Other situations arise in which isolation of certain zones within a formation may be beneficial. For example, one method to increase the production of a well is to perforate the well in a number of different locations, either in the same hydrocarbon bearing zone or in different hydrocarbon bearing zones, and thereby increase the flow of hydrocarbons into the well. The problem associated with producing from a well in this manner relates to the control of the flow of fluids from the well and to the management of the reservoir. For example, in a well producing from a number of separate zones (or from laterals in a multilateral well) in which one zone has a higher pressure than another zone, the higher pressure zone may disembogue into the lower pressure zone rather than to the surface. Similarly, in a horizontal well that extends through a single zone, perforations near the "heel" of the well, i.e., nearer the surface, may begin to produce water before those perforations near the "toe" of the well. The production of water near the heel reduces the overall production from the well.

During the drilling process, muds are circulated downhole to remove rock as well as deliver agents to combat the variety of issues described above. Mud compositions may be water or oil-based (including mineral oil, diesel, or synthetic oils) and may comprise weighting agents, surfactants, proppants, and gels. In attempting to cure these and other problems, crosslinkable or absorbing polymers, loss control material (LCM) pills, and cement squeezes have been employed. Gels, in particular, have found utility in preventing mud loss, stabilizing and strengthening the wellbore, and zone isolation and water shutoff treatments.

In many wells, water-based and oil-based muds are both used. Water-based muds are generally used early in the drilling process. Later, oil-based muds are substituted as the well gets deeper and reaches the limit of water-based muds due to limitations such as lubricity and well bore stabilization. The majority of gels employ water compatible gelling and crosslinking agents, which are useful when using water-based muds. There is, however, a dearth of methods using non-aqueous gels which are compatible with oil-based muds.

Thus, there is a need for the development of non-aqueous gels for downhole applications that are relatively environmentally safe and compatible with oil-based muds.

SUMMARY OF INVENTION

In one aspect, embodiments disclosed herein relate to a method of treating an earth formation that includes injecting at least one lipophilic monomer into the earthen formation; wherein the at least one lipophilic monomer is selected from epoxide-functionalized derivative of soybean oil, linseed oil, rapeseed oil, cashew nut shell oil; perilla oil, tung oil, oiticia oil, safflower oil, poppy oil, hemp oil, cottonseed oil, sunflower oil, high-oleic triglycerides, triglycerides of euphorbia plants, peanut oil, olive oil, olive kernel oil, almond oil, kapok oil, hazelnut oil apricot kernel oil, beechnut oil, lupine oil, maize oil, sesame oil, grapeseed oil, lallemantia oil, castor oil, herring oil, sardine oil, menhaden oil, whale oil, and tall oil; injecting at least one crosslinking agent into the earthen formation; wherein the at least one crosslinking agent comprises at least one primary amine; and allowing the lipophilic monomer and the crosslinking agent to react in an earth formation.

In another aspect, embodiments disclosed herein relate to a method of making a non-aqueous gel that includes providing a mixture of at least one lipophilic monomer and at least one crosslinking agent in an oil-based solvent, wherein the at least one lipophilic monomer is selected from an epoxide-functionalized derivative of soybean oil, linseed oil, rapeseed oil, cashew nut shell oil; perilla oil, tung oil, oiticia oil, safflower oil, poppy oil, hemp oil, cottonseed oil, sunflower oil, high-oleic triglycerides, triglycerides of euphorbia plants, peanut oil, olive oil, olive kernel oil, almond oil, kapok oil, hazelnut oil, apricot kernel oil, beechnut oil, lupine oil, maize oil, sesame oil, grapeseed oil, lallemantia oil, castor oil, herring oil, sardine oil, menhaden oil, whale oil, and tall oil; and wherein the at least one crosslinking agent comprises at least one primary amine; and allowing the mixture to react to form a gel.

In yet another aspect, embodiments disclosed herein relate to a non-aqueous gel that includes at least one lipophilic monomer, wherein the at least one lipophilic monomer is selected from an epoxide-functionalized derivative of soybean oil, linseed oil, rapeseed oil, cashew nut shell oil; perilla oil, tung oil, oiticia oil, safflower oil, poppy oil, hemp oil, cottonseed oil, sunflower oil, high-oleic triglycerides, triglycerides of euphorbia plants, peanut oil, olive oil, olive kernel oil, almond oil, kapok oil, hazelnut oil, apricot kernel oil, beechnut oil, lupine oil, maize oil, sesame oil, grapeseed oil, lallemantia oil, castor oil, herring oil, sardine oil, menhaden oil, whale oil, and tall oil; and at least one crosslinking agent, wherein the at least one crosslinking agent comprises at least one primary amine.

In yet another embodiment, a method of treating an earth formation that includes injecting at least one lipophilic monomer and at least one crosslinking agent in a non-aqueous solution and having an initial viscosity in the range of approximately 500 centipoise to 80,000 centipoise measured at 25° C. using an LV2 spindle at low rotational speeds; and allowing at least one lipophilic monomer and at least one crosslinking agent to react in the earth formation.

Other aspects and advantages of the invention will be apparent from the following description and the appended claims.

DETAILED DESCRIPTION

In one aspect, embodiments disclosed herein relate to non-aqueous gels with a formed from at least one lipophilic monomer and at least one crosslinking agent. In other aspects, embodiments disclosed herein relate gels formed having a viscosity in the range of approximately 500 to 80,000 centipoise. In yet other aspects, embodiments disclosed herein relate to methods for making non aqueous gels, and applications in which the gels disclosed herein may be useful. In the following description, numerous details are set forth to provide an understanding of the present disclosure. However, it will be understood by those skilled in the art that the present invention may be practiced without these details and that numerous variations or modifications from the described embodiments may be possible.

A crosslinking agent and a gelling agent (the material to be crosslinked) may be reacted to form a gel. A gel is a solid, jelly-like material formed from a colloidal solution. By weight, gels are mostly liquid, yet they behave like solids. In some embodiments, the gelling agent may be dissolved in a non aqueous fluid to form a solution, and a crosslinking agent may be added to the solution, reacting with the gelling agent to form a gel. The non-aqueous gel may be used in downhole applications as a component of drilling mud and may be preformed and pumped downhole. Alternatively, the components may be introduced sequentially downhole forming the gel in situ.

Lipophilic Monomer

In one embodiment, a non-aqueous gel is formed by aging of a lipophilic monomer and a crosslinking agent. In one embodiment, the gel may be formed from a lipophilic monomer which is capable of being chemically crosslinked to form a polymeric structure. In a particular embodiment, suitable lipophilic monomers may comprise various epoxidized natural oils such as soybean oil, linseed oil, rapeseed oil, cashew nut shell oil, perilla oil, tung oil, oiticia oil, safflower oil, poppy oil, hemp oil, cottonseed oil, sunflower oil, high-oleic triglycerides, triglycerides of euphorbia plants, peanut oil, olive oil, olive kernel oil, almond oil, kapok oil, hazelnut oil, apricot kernel oil, beechnut oil, lupin oil, maize oil, sesame oil, grapeseed oil, lallemantia oil, castor oil, herring oil, sardine oil, menhaden oil, whale oil, and tall oil. A lipophilic monomer containing an epoxide group may serve as the reactive electrophilic group for crosslinking with an appropriate nucleophile according to the general chemical reaction:

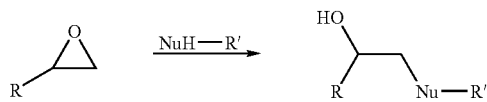

wherein R represents a lipophilic group and may comprise a plurality of epoxide groups for crosslinking, and R'NuH represents a crosslinking agent and may comprise a plurality of heteroatom nucleophiles.

In a particular embodiment, the lipophilic monomer may comprise epoxide-containing derivatives of cardanol, which is represented by the following structure:

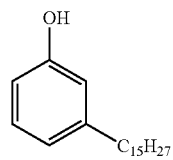

Cardanol is a meta substituted alkenyl phenol derived from naturally occurring phenols extracted from cashew nut shell liquid, derivatives of which are available from several commercial sources including Cardolite Corporation (Newark, N.J.). Due to the mixed aliphatic/aromatic structure of cardanol, its derivatives are compatible with a wide array of organic solvents, including OBM. The aliphatic side chain contains a single unsaturation which may be epoxidized and thus provides a point for possible crosslinking. Cardanol also possesses many chemical characteristics of phenols, namely reactive ortho and para positions for electrophilic aromatic substitution. Such reactivity patterns are the basis of the synthesis of commercially available derivatives such as formaldehyde condensation oligomers (novolac or novolak resins as known by those skilled in the art) such with the general structure:

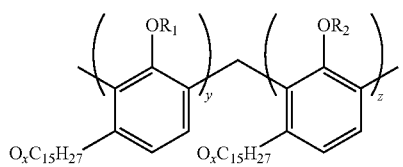

wherein X is 0 or 1 and represents whether or not the aliphatic side chain is epoxidized, y and z represent repeating cardanol units that may have differing functional groups on the aromatic phenol group ($R_1$ and $R_2$). The total number of cardanol units in the oligomer is represented by the sum of y and z and may vary from 1 to 30 in one embodiment, from 1 to 10 in another embodiment, and from 1 to 5 in yet another embodiment. The side chain phenolic groups, $R_1$ and $R_2$, may be independently hydrogen, alkyl or an alkenyl epoxide side chain comprising from 2 to 15 carbons. Alkyl and alkenyl epoxides may comprise straight carbon chains, branched carbon chains, or combinations thereof. Additionally, one skilled in the art would recognize that both alkyl and alkenyl carbon chains may be substituted and may comprise derivatives with at least one of halogen, alkoxy, aryl, and heteroaryl substituents, for example, each of which may be also substituted. Furthermore, one skilled in the art would also recognize that, as used herein, "substituted" refers to the replacement of hydrogen(s) on the alkyl or alkenyl chain (or any of its substituents) with any other atom or group of atoms including isotopes such as deuterium or tritium.

In one embodiment, the aliphatic side chain may maintain its unsaturation (x=0) or it may be epoxidized (x=1). In the novolac type resins, formaldehyde may serve to connect the cardanol units with methylene ($CH_2$) bridges. Oligomers of cardanol may comprise 2-30 cardanol units (y+z) in one embodiment. The phenolic group of cardanol may be further functionalized, and the formaldehyde oligomer products may incorporate phenols with differing substitution on the phenol ($R_1$ and $R_2$). Although, in this embodiment, two different phenolic substitutions are shown, one of ordinary skill in the art would appreciate that more than two different phenolic substitutions may be incorporated into an oligomer.

In one embodiment, an epoxide may be present in the phenolic substituents $R_1$ and $R_2$. This may be the epoxide of a straight alkenyl chain which may comprise vinyl, propenyl, butenyl, pentenyl, hexenyl, heptenyl, octenyl, nonenyl, decenyl, undecenyl, and dodecenyl side chains. In a particular embodiment the side chain may be the epoxide of a propenyl side chain (a glycidyl ether). While specific embodiments refer to straight chain alkenyl side chains, one of ordinary skill in the art would appreciate that epoxides of branched chain alkenyl substitutions on the phenol group may also be possible.

In one embodiment, the lipophilic monomer may have the structure represented by x=0, y=0, z=1 and $R_1$=glycidyl ether. In such a case the nucleophilic crosslinking partner may require more than one functional amine nucleophile. In another embodiment, the lipophilic monomer may have the structure represented by x=1, y=0, z=1 and $R_1$=glycidyl ether. In yet another embodiment, the lipophilic monomer may have the structure represented by x=0, y+z=5, $R_1$=glycidyl ethers of the phenol of cardanols in positions 1, 3 and 5 of the oligomer and $R_2$=hydrogen on the phenol of cardanols in positions 2 and 4 of the oligomer.

In another embodiment, the lipophilic monomer may be a cardanol derivative with a functionalized aliphatic side chain as represented by the following structure:

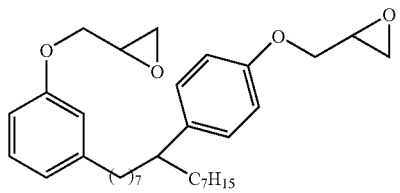

With respect to applications in oil drilling, a lipophilic monomer may be desirable when used in conjunction with an oil-based mud (OBM). The lipophilic character may lend solubility to the resultant polymer structure in the OBM. One of ordinary skill in the art would recognize that the appropriate choice of lipophilic monomer would depend on the desired properties of the end product gel. Traits that may be of interest in selecting a lipophilic monomer may include gellation times at various temperatures, and the gel properties, such as gel strength, as inferred and defined by its resistance to tensile, compressive and impact forces, flexibility, rigidity, adhesion, chemical and heat tolerance.

In a particular embodiment, the lipophilic monomer may include a polyglycidyl ethers cardanol, castor oil, propoxylated glycerine, polypropylene glycol, propoxylated sorbitol, and epoxidized polysulphide. In yet another particular embodiment, the lipophilic monomer may have an epoxy equivalent weight ranging from 500 to 1000 gram/equivalent. However, one of ordinary skill in the art would appreciate that this number may vary depending on the identity of the lipophilic monomer used.

Crosslinking Agent

In one embodiment, the polymeric material also comprises at least one crosslinking agent in order to effect polymerization of the lipophilic monomer. In general, the crosslinking agent may be any nucleophilic group that may react to open an epoxide. In a further embodiment, the crosslinking agent may comprise a polyfunctional molecule with more than one nucleophilic group. In particular embodiments, the nucleophilic groups may comprise amines, alcohols, phenols, thiols, carbanions, and carboxylates.

In one embodiment, the crosslinking agent may be an aliphatic polyamine such as ethylenediamine (EDA), diethylenetriame (DTA), and triethylenetetramine (TETA), which comprise a short, linear chain between amine groups. Crosslinking with such agents tends to create highly crosslinked layers with good resistance to heat and chemicals, including solvents. In another embodiment the amine may be a polyethylenimine (PEI) which are ethylenediamine polymers and are commercially available under the trade name Lupasol® from BASF (Germany). PEIs may vary in degree of branching and therefore may vary in degree of crosslinking. Lupasol® PEIs may be small molecular weight constructs such as Lupasol® FG with an average molecular weight of 800 or large molecular weight constructs such as Lupasol® SK with average molecular weight of 2,000,000.

In yet another embodiment the amine may be a polyetheramine such as those commercially available under the trade name Jeffamine® Huntsman Performance Products (Woodlands, Tex.). For example, useful Jeffamine® products may include triamines Jeffamine® T-5000 and Jeffamine® T-3000 or diamines such as Jeffamine® D-400 and Jeffamine® D-2000. Useful polyetheramines may possess a repeating polyether backbone and may vary in molecular weight from about 200 to about 5000 g/mol. Crosslinking with these constructs may lead to products with excellent flexibility and impact resistance.

In one embodiment, the crosslinking agent may include modified cycloaliphatic amines derived from 3-aminomethyl-3,5,5-trimethyl cyclohexyl amine (IPDA). They produce crosslinked products with a fast cure rate, and are suitable for low temperature operations. Crosslinked products comprising IPDA derivatives provide very good resistance to chemicals, common solvents and water.

In one embodiment, the crosslinking agent may be an aromatic amine. The amine groups are separated by rigid benzene rings rather than flexible chains of molecules as in the aliphatic amines. Polymers produced with aromatic amines may possess good physical properties like impact resistance as well as high resistance to heat and chemicals, particularly when they are formulated with epoxy novolac-type resins. Such crosslinked products may also exhibit high temperature resistance and may possess good water resistance. Aromatic amines may comprise such commercial products as the phenalkamines available from Cardolite Corporation (Newark, N.J.) and may include Lite-2002, NC-558, NC-540, NC-541, NC-546, NC-549 and NC-550.

One of skill in the art should appreciate that the molar equivalent ratio of the lipophilic monomer to the selected cross-linking agent (LM:CLA) will affect the extent of crosslinking achieved. Through routine variation of the molar equivalent ratio LM:CLA, one of skill in the art should be easily able to determine the proper molar equivalent ratio to obtain a desired gel. In one embodiment, the ratio may be selected for high crosslinking that may lead to harder gel structures.

Gel Preparation

In one embodiment, the gel is formed by mixing the lipophilic monomer with the crosslinking agent in an appropriate solvent. Solvents that may be appropriate may comprise oil-based muds for use in downhole applications and may include mineral oil, diesel, and synthetic oils.

One of ordinary skill in the art would recognize that the optimal ratios for the lipophilic monomer and crosslinking agents may vary depending on the exact structures and desired properties of the gel. In one embodiment, the weight ratio of lipophilic monomer to crosslinking agent may vary from a range of about 1:2 to about 2:1, and from about 1.5:1 to 1:1.5 in another embodiment and from about 1.2:1 to 1:1.2 in yet another embodiment. The amount of crosslinking agent may affect the hardness of the resulting gel. For example, in some embodiments, for a constant weight of lipophilic monomer, increasing the amount of crosslinking agent may result in higher crosslinking density, and therefore a harder gel.

One of ordinary skill in the art would also recognize that the optimal volume of the crosslinking agent relative to the total volume of the gel may vary depending upon the desired properties of the gel. In one embodiment, the volume percent of the crosslinking agent relative to the total volume of the gel comprises approximately 10 to 40 percent by volume. In another embodiment, the volume percent of the crosslinking agent relative to the total volume of the gel is approximately 15 to 30 percent by volume.

Aging Temperature

In some embodiments, the lipophilic monomer and the crosslinking agent may be reacted at a temperature from −50 to 300° C. In other embodiments, the lipophilic monomer and the crosslinking agent may be reacted at a temperature from 25 to 250° C.; from 50 to 15° C. in other embodiments; and from 60 to 100° C. in yet other embodiments. In certain embodiments, the reaction temperature determines the amount of time required for gel formation.

Time Required for Gel Formation

Embodiments of the gels disclosed herein may be formed by mixing a lipophilic monomer with a crosslinking agent. In some embodiments, a gel may form immediately upon mixing the lipophilic monomer and the crosslinking agent. In other embodiments, a gel may form within 1 minute of mixing; within 5 minutes of mixing in other embodiments; within 30 minutes of mixing in other embodiments. In some embodiments, a gel may form within 1 hour of mixing; within 8 hours in other embodiments; within 16 hours in other embodiments; within 80 hours in other embodiments; within 120 hours in yet other embodiments.

pH

In some embodiments, the lipophilic monomer and the crosslinking agent may be reacted in a medium having a pH greater than 4. In other embodiments, the lipophilic monomer and the crosslinking agent may be reacted in a medium having a pH greater than 6; a pH greater than 7 in other embodiments; a pH greater than 8 in other embodiments; a pH greater than 9 in yet other embodiments.

Reagents which may be used to adjust the pH may include alkali metal hydroxides, such as sodium hydroxide, potassium hydroxide, calcium hydroxide, and rubidium hydroxide, lithium hydroxides, benzyltrimethylammonium hydroxides, and the partially neutralized salts of organic acids, such as tri-sodium ethylenediaminetetraacetic acid. In some embodiments, the alkali metal hydroxide, pH adjusting agent, or buffer, may act as a catalyst, effecting or enhancing the crosslinking reaction between the lipophilic monomer and the crosslinking agent.

In another embodiment, non-reacting tertiary amines may be added to accelerate the epoxy amine reaction. In some embodiments, the tertiary amine, such as triisopropanolamine, may accentuate the degree of crosslinking and thus the hardness of the resulting gel.

Solvent Concentration

In some embodiments, the viscosity may be varied to obtain a desired degree of flow sufficient for decreasing the flow of water through or increasing the load-bearing capacity of a formation. The viscosity of the solution may be varied by increasing or decreasing the amount of solvent relative to the crosslinking agents and lipophilic monomer, by employing viscosifying agents, or by other techniques common in the art.

In some embodiments, the combined amount of lipophilic monomer and crosslinking agents may range from 0.5 to 100 weight percent, based upon the total weight of solvent in the solution. In other embodiments, the combined amount of lipophilic monomer and crosslinking agents may range from 5 to 100 weight percent, based upon the total weight of solvent in the solution; from 20 to 70 weight percent in other embodiments; from 25 to 65 weight percent in yet other embodiments. As used herein, total weight of solvent is exclusive of any water added with pH adjusting reagents.

Viscosity may be measured by using a Brookfield DV-II+ Viscometer. One of skill in the art will appreciate that the viscosity measurements will be dependent upon the temperature of the gel composition, the type of spindle, and the number of revolutions per minute. The viscosity ranges disclosed herein were measured at 20° C. using a Brookfield DV-II+ Viscometer with a LV2 spindle. The viscosity may be measured by lowering the viscometer into the center of the sample until the spindle is immersed the middle of the immersion mark. Care should be taken not to trap air under the spindle. The viscometer can be started after adjusting the viscometer to the desired RPM. If more than one RPM is to be used, the viscometer should be started at the lowest desired RPM. This reduces the amount of shear introduced to the sample, resulting in more accurate readings at lower RPM's.

In some embodiments, the mixing of the gelling agent and the crosslinking agent may produce gel compositions having an initial viscosity ranging from approximately 500 centipoise to 80,000 centipoise measured at 25° C. using an LV2 spindle at low rotational speeds (12 rpm or less). In other embodiments, the mixing of the gelling agent and the crosslinking agent may produce gels having an initial viscosity ranging from approximately 1000 centipoise to 10,000 centipoise measured at 25° C. using an LV2 spindle at low rotational speeds (12 rpm or less).

The lipophilic monomer and the crosslinking agent may react to form gel beads. For example, in some embodiments, bead formation may be effected by agitation of the solution. In other embodiments, bead formation may be effected by forming an emulsion or suspension of the reactants in water with about 1 to 20% oil-based solvent.

Hardness

The reaction of the lipophilic monomer and the crosslinking agent may produce gels having a consistency ranging from a viscous sludge to a hard gel. In some embodiments, the reaction of the lipophilic monomer and the crosslinking agent may result in a soft elastic gel. In other embodiments, the reaction may result in a good gel; in a hard gel in yet other embodiments. The hardness of the gel is the force necessary to break the gel structure, which may be quantified by measuring the force required for a needle to penetrate the crosslinked structure. Hardness is a measure of the ability of the gel to resist to an established degree the penetration of a test needle driven into the sample at a constant speed.

Hardness may be measured by using a Brookfield QTS-25 Texture Analysis Instrument. This instrument consists of a probe of changeable design that is connected to a load cell. The probe may be driven into a test sample at specific speeds or loads to measure the following parameters or properties of a sample: springiness, adhesiveness, curing, breaking strength, fracturability, peel strength, hardness, cohesiveness, relaxation, recovery, tensile strength burst point, and spreadability. The hardness may be measured by driving a 2.5 mm diameter, cylindrical, flat faced probe into the gel sample at a constant speed of 30 mm per minute. When the probe is in contact with the gel, a force is applied to the probe due to the resistance of the gel structure until it fails, which is recorded via the load cell and computer software. As the probe travels through the sample, the force on the probe is measured. The force on the probe may be recorded providing an indication of the gel's overall hardness. For example, the initial peak force may be recorded at the point the gel first fails, close to the first contact point, followed by recording highest and lowest values measured after this point where the probe is travelling through the bulk of the gel.

In one embodiment, non-aqueous gels useful in downhole applications may comprise gels with a hardness ranging from about 10 to 7,000 psi. In other embodiments, the gel may have a hardness ranging from about 100 to 5,000 psi, and from 300 to 2,000 psi in yet other embodiments.

With respect to the variables listed above (i.e. temperature, time, etc.), those having ordinary skill in light of the disclosure will appreciate that, by using the present disclosure as a guide, properties may be tailored as desired.

EXAMPLE 1

A gel was synthesized by mixing Cardolite® NC-547 and Jeffamine® T-5000 in a 1:1 ratio in mineral oil and heated to 70° C. After heating for 16 hours, a firm gel is formed.

TABLE 1

Effect of Added Tertiary Amine (Triisopropanolamine)

| Lipophilic monomer | Base Oil | Amine crosslinker | Tertiary Amine | Observs. @ 70° C. | Observs. @ 70° C. | Hardness after aging |
|---|---|---|---|---|---|---|
| Epoxy Resin; 8% | 83% | 8% | 1% | Liq @ 6 h | Elastic Gel 16 h | 85 psi |
| Epoxy Resin; 8% | 82% | 8% | 2% | Liq @ 6 h | Elastic Gel 16 h | 165 psi |
| Epoxy Resin; 8% | 80% | 8% | 4% | Liq @ 6 h | Elastic Gel 16 h | 218 psi |

EXAMPLE 2

The following non aqueous gel was formulated to illustrate the characteristics of an exemplary non aqueous gel:

TABLE 2

| Material | Function | Amount |
|---|---|---|
| DF1 | Base Oil | 10 mL |
| Cardolite NC 547 | Epoxy Gelling Agent | 2 mL |
| Jeffamine T5000 | Trifunctional amine Gelling Agent | 2 mL |
| Triisopropanolamine | Tertiary amine hardening agent | 0.2 mL |

Cardolite® NC-547, Jeffamine® T-5000, Triisopropanolamine, and base oil are mixed with an equivalent concentration of the additives found in Table 3:

TABLE 3

| Additive | Description |
|---|---|
| TRUVIS | Organophilic clay |
| VERSAGEL SUPREME (VGS) | Organophilic clay |
| VESACLEAN VB (VB) | Oil based fluid surfactant |

TABLE 3-continued

| Additive | Description |
|---|---|
| VERSACLEN FL (FL) | Oil based fluid surfactant |
| SUREMUL EH | Oil based fluid surfactant |

Concentrations of barite were added to a fluid density of 10, 12 and 14 pounds per gallon (ppg). The mixture was then dynamically aged at 76 C (170 F) for one hour. Thereafter, the mixture was left static at 76 C (170 F) and the time to gel was recorded. Table 4 details the results:

TABLE 4

| Additive | 30 min dyn | 60 min dyn | 2.5 hr stat | 3 hr stat | 4 hr stat | Ini peak | Bulk hardness |
|---|---|---|---|---|---|---|---|
| Control | Liquid | Liquid | Weak gel | Gel | Gel | 126 | 24-146 |
| 5 ppb Truvis | Liquid | Liquid | Med gel | Gel | Gel | 210 | 76-234 |
| 10 ppb Truvis | Liquid | Liquid | Med gel | Gel | Gel | 247 | 30-240 |
| 5 ppb VGS | Liquid | Liquid | Med gel | Gel | Gel | 242 | 34-193 |
| 10 ppb VGS | Liquid | Liquid | Med gel | Gel | Gel | 161 | 90-215 |
| 5 ppb Lime | Liquid | Liquid | Med gel | Gel | Gel | 166 | 102-355 |
| 10 ppb Lime | Liquid | Liquid | Med gel | Gel | Gel | 228 | 140-432 |
| 2.5 each VB/FL | Liquid | Liquid | Liquid | Weak gel | Gel | 157 | 22-119 |
| 5 each VB/FL | Liquid | Liquid | Liquid | Liquid | Weak gel | 160 | 43-196 |
| 5 ppb Suremul EH | Liquid | Liquid | Liquid | Weak gel | Gel | 147 | 65-146 |
| 10 ppb Suremul EH | Liquid | Liquid | Liquid | Liquid | Weak gel | 122 | 33-83 |
| Barite 10 ppg | Liquid | Liquid | Gel** | Gel | Gel | 175 | 84-300 |
| Barite 12 ppg | Liquid | Liquid | Gel** | Gel | Gel | 196 | 115-527 |
| Barite 14 ppg | Liquid | Liquid | Gel** | Gel | Gel | 339 | 178-764 |
| Brine 90:10 OWR | Liquid | Liquid | Viscous* | Weak gel | Gel | 138 | 46-157 |
| Brine 80:20 OWR | Liquid | Liquid | Viscous* | Weak gel | Gel | 79 | 15-113 |
| Brine 60:40 OWR | Liquid | Liquid | Viscous* | Weak gel | Gel | 79 | 33-115 |

Note:
*= separated out into two phases - shaken until homogenous
**= barite sagged out Organophilic clay improves the gel strength, while lime and barite increase the gel hardness. The hardness increase from the presence of lime could be attributed to its strongly basic nature, which helps promote the epoxy-amine reactions, thereby resulting in more bond formation and a harder gel. This effect occurs even though the lime is not oil soluble. The barite did settle out of the gel formulation due to the absence of organoclay and oil wetting agents. This indicates the need to have sufficient viscosity to suspend solid particles added to the fluid. The oil based surfactants did not dramatically effect gel strength, High levels of brine (above 10%) reduced the strength of the gel, however the samples still gelled. These results signify the compatibility of the lipophilic monomer and crosslinking agent with oil based fluid components.

EXAMPLE 2

Table 5 details a non aqueous gel formulated to illustrate the viscosity of an exemplary gel formulation:

TABLE 5

| Additive | Amount | g or ml | Function |
|---|---|---|---|
| HDF1 | 90 | ml | Base oil |
| VERSAGEL SUPREME | 2.3 | g | Organoclay |
| JEFFAMINE T5000 | 45 | ml | Trifunctional Amine polymer |
| CARDOLITE NC547 | 45 | ml | Epoxidised Polymer Resin |
| Triisopropanolamine | 0.3 | ml | Tertiary Amine hardener |
| STARCARB | 60 | g | bridging solid |
| FORDACAL 60 | 41.2 | g | bridging solid |
| G-SEAL | 18.8 | g | bridging solid |

The components in Table 5 were mixed, and tested prior to gelling. The viscosity was measured using a Brookfield DV-II+ Viscometer using spindle LV2 at 0.3 rpm at 25° C. Table 6 details the typical viscosity ranges for the Brookfield DV-II+ Viscometer at 1, 2, and 3 minutes.

TABLE 6

| Viscosity @ | (cps) |
|---|---|
| 1 m | 11,300 |
| 2 m | 12,300 |
| 3 m | 13,500 |

Thereafter, a repeat test was conducted to verify the viscosity of the mixture at various rotational speeds. The viscosity of the mixture at 25° C. was determined using a LV1 spindle. The resulting viscosities are listed in Table 7.

TABLE 7

| Viscosity (cps) | | |
|---|---|---|
| Rotational Speed (rpm) | 0.3 | 1 |
| Gel Formulation | 8,000 | 11,500 |

EXAMPLE 3

The following formulation in Table 8 illustrates the viscosity of an exemplary gel formulation comprising 10.5 ppg of carbonate:

TABLE 8

| Product | Sg | Weight | Volume | Function |
|---|---|---|---|---|
| Diesel | 0.840 | 113.82 | 135.51 | Base oil |
| VERSAGEL SUPREME | 1.700 | 4.50 | 2.65 | Organoclay Viscosifier |
| CARDOLITE NC547 | 0.900 | 60.98 | 67.75 | Epoxidised Polymer Resin |
| JEFFAMINE T5000 | 1.003 | 67.96 | 67.75 | Trifunctional Amine polymer |
| Triisopropanolamine | 1.010 | 4.56 | 4.52 | Tertiary Amine hardener |
| SAFECARB 40 | 2.680 | 119.00 | 44.40 | bridging solid |
| SAFECARB 250 (blend) | 2.680 | 20.00 | 7.46 | bridging solid |
| SAFECARB 500 (blend) | 2.680 | 25.00 | 9.33 | bridging solid |
| G-SEAL | 2.250 | 25.00 | 11.11 | bridging solid |

The components listed in Table 8 were mixed and the viscosity was measured prior to the mixture gelling. The viscosity was measured using a Brookfield DV-II+ Viscometer with spindle LV1 at 0.3 rpm at 25° C. Table 9 details the resulting viscosity, measured at 1, 2, and 3 minutes.

TABLE 9

| | Time | | |
|---|---|---|---|
| | 1 m | 2 m | 3 m |
| Spindle 1 | Off scale at lowest speed | Off scale at lowest speed | Off scale at lowest speed |
| Spindle 3 @ 0.3 rpm | 21,000 | 23,000 | 24,000 |

EXAMPLE 4 OF THE VISCOSITY OF A FORMULATION COMPRISING VARYING DIESEL CONCENTRATIONS

The following formulation in Table 10 illustrates the viscosity of a formulation comprising 10.5 ppg barite and 45% diesel:

TABLE 10

| Product | Sg | Weight | Volume | Function |
|---|---|---|---|---|
| Diesel | 0.840 | 109.37 | 130.20 | Base oil |
| VERSAGEL SUPREME | 1.700 | 3.00 | 1.76 | Organoclay Viscosifier |
| CARDOLITE NC547 | 0.900 | 71.61 | 79.57 | Epoxidised Polymer Resin |
| JEFFAMINE T5000 | 1.003 | 83.00 | 79.57 | Trifunctional Amine polymer |
| Triisopropanolamine | 1.010 | 5.36 | 5.30 | Tertiary Amine hardener |
| Barite | 4.200 | 78.50 | 18.69 | Weighting Agent |
| STARCARB | 2.680 | 65.00 | 24.25 | bridging solid |
| G-Seal (Blend) | 2.250 | 25.00 | 11.11 | bridging solid |

The components listed in Table 10 were mixed, and the viscosity was measured prior to the mixture gelling. The viscosity was measured using a Brookfield DV-II+ Viscometer with spindle LV2 at 0.3 rpm at 25° C. Table 11 details the resulting viscosity, measured at 1, 2, and 3 minutes.

TABLE 11

| | Time | | |
|---|---|---|---|
| | 1 m | 2 m | 3 m |
| Visc (cps) | 31,393 | 33,300 | 35,200 |

The following formulation in Table 12 illustrates the difference in viscosity when the reduced diesel concentration is reduced, and the organoclay concentration is increased:

TABLE 12

| Product | Sg | Weight | Volume |
|---|---|---|---|
| Diesel | 0.840 | 101.48 | 123.00 |
| VERSAGEL SUPREME | 1.700 | 5.20 | 3.06 |
| CARDOLITE NC547 | 0.900 | 67.65 | 75.17 |
| JEFFAMINE T5000 | 1.003 | 83.00 | 75.17 |
| Triisopropanolamine | 1.010 | 5.36 | 5.31 |
| STARCARB | 2.680 | 149.50 | 55.78 |
| G-Seal (Blend) | 2.250 | 25.00 | 11.11 |

The components listed in Table 12 were mixed and the viscosity was measured prior to the mixture gelling. The viscosity was measured using a Brookfield DV-II+ Viscometer with spindle LV2 at 0.3 rpm at 25° C. Table 13 details the resulting viscosities of the gel when measured at 1, 2, and 3 minutes.

TABLE 13

| | Time | | |
|---|---|---|---|
| | 1 m | 2 m | 3 m |
| Visc (cps) | 88,483 | 88,781 | 91,381 |

As seen above, the viscosity of the mixture increases substantially as the concentrations of diesel decreases and the organo clay content increases.

The following non aqueous gel shown in Table 14 was formulated to illustrate the difference in viscosity when the diesel concentration remains constant between Table 12 and Table 14, and the organoclay concentration is decreased:

TABLE 14

| Product | Sg | Weight | Volume |
|---|---|---|---|
| Diesel | 0.840 | 101.48 | 123.30 |
| Organoclay | 1.700 | 3.50 | 2.06 |
| EMI1060 epoxy | 0.900 | 67.82 | 75.35 |
| EMI1061 amine | 1.003 | 83.00 | 75.35 |
| EMI1062 accel | 1.010 | 5.36 | 5.31 |
| STARCARB | 2.680 | 149.50 | 55.78 |
| G-Seal (Blend) | 2.250 | 25.00 | 11.11 |

The components listed in Table 14 were mixed for a period of time and the viscosity was measured prior to the mixture gelling. The viscosity was measured using a Brookfield DV-II+ Viscometer with spindle LV2 at 0.3 rpm at 25° C. Table 15 details the resulting viscosities of the gel when measured at 1, 2, and 3 minutes.

TABLE 15

| | Time | | |
|---|---|---|---|
| | 1 m | 2 m | 3 m |
| Visc (cps) | 52,000 | 59,000 | 60,200 |

Comparison of the values found in Tables 13 and 15 reveal that the viscosity of the gel decreased substantially as the concentrations of the organoclay content decreased.

Applications

Some embodiments of the gels disclosed herein may be formed in a one-solution single component system, where the crosslinking agent(s) are premixed with the lipophilic monomer (material to be crosslinked). The gel may then be placed or injected prior to cure. The gel times may be adjusted by adjusting the concentration of the solvent, reactants, and hardening agents, such as inorganic base or tertiary amine, in the solution. Other embodiments of the gels disclosed herein may also be formed in a two-component system, where the crosslinking and lipophilic monomers may be mixed separately and combined immediately prior to injection. Alternatively, one reagent, the crosslinking or lipophilic monomer, may be placed in the wellbore or the near-wellbore region where it may then be contacted by the other reagent, either the crosslinking or lipophilic monomer as required. Gel times may be adjusted by varying the ratio of reactant, the concentration of tertiary amine catalyst, and quantity of solvent.

Use in Drilling Muds

Embodiments of the gels disclosed herein may be used in applications including: as an additive in drilling muds, in particular oil based muds, and as an additive in loss circulation material (LCM) pills; wellbore (WB) strengthening treatments. One of ordinary skill in the art would recognize that the gels disclosed herein may also find use in other downhole applications, such as insulating packer fluids and remediations for sustained casing pressure, where gel treatments may be typically used.

Drilling fluids or muds typically include a base fluid (for example water, diesel or mineral oil, or a synthetic compound), weighting agents (for example, barium sulfate or barite may be used), bentonite clay, and various additives that serve specific functions, such as polymers, corrosion inhibitors, emulsifiers, and lubricants. Those having ordinary skill in the art will recognize that a number of different muds exist, and limitations on the present disclosure is not intended by reference to particular types. During drilling, the mud is injected through the center of the drill string to the drill bit and exits in the annulus between the drill string and the wellbore, fulfilling, in this manner, the cooling and lubrication of the bit, casing of the well, and transporting the drill cuttings to the surface.

The gels disclosed herein may be used as an additive in drilling mud. In one embodiment, gels described by the procedures above may be included in a wellbore fluid. The wellbore fluids may include an oleaginous continuous phase, a non-oleaginous discontinuous phase, and a gel as disclosed herein. One of ordinary skill in the art would appreciate that the gel formulations described above may be modified in accordance with the desired application. For example, modifications may include the degree of crosslinking, and/or the nature of the epoxide reactive polymer.

The oleaginous fluid may be a liquid and more preferably is a natural or synthetic oil and more preferably the oleaginous fluid is selected from the group including diesel oil;

mineral oil; a synthetic oil, such as hydrogenated and unhydrogenated olefins including polyalphaolefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof. The concentration of the oleaginous fluid should be sufficient so that an invert emulsion forms and may be less than about 99% by volume of the invert emulsion. In one embodiment the amount of oleaginous fluid is from about 30% to about 95% by volume and more preferably about 40% to about 90% by volume of the invert emulsion fluid. The oleaginous fluid in one embodiment may include at least 5% by volume of a material selected from the group including esters, ethers, acetals, dialkylcarbonates, hydrocarbons, and combinations thereof.

The non-oleaginous fluid used in the formulation of the invert emulsion fluid disclosed herein is a liquid and preferably is an aqueous liquid. More preferably, the non-oleaginous liquid may be selected from the group including sea water, a brine containing organic and/or inorganic dissolved salts, liquids containing water-miscible organic compounds and combinations thereof. The amount of the non-oleaginous fluid is typically less than the theoretical limit needed for forming an invert emulsion. Thus in one embodiment the amount of non-oleaginous fluid is less than about 70% by volume and preferably from about 1% to about 70% by volume. In another embodiment, the non-oleaginous fluid is preferably from about 5% to about 60% by volume of the invert emulsion fluid. The fluid phase may include either an aqueous fluid or an oleaginous fluid, or mixtures thereof. In a particular embodiment, coated barite or other weighting agents may be included in a wellbore fluid comprising an aqueous fluid that includes at least one of fresh water, sea water, brine, and combinations thereof.

The fluids disclosed herein are especially useful in the drilling, completion and working over of subterranean oil and gas wells. In particular the fluids disclosed herein may find use in formulating drilling muds and completions fluids that allow for the easy and quick removal of the filter cake. Such muds and fluids are especially useful in the drilling of horizontal wells into hydrocarbon bearing formations.

Conventional methods can be used to prepare the drilling fluids disclosed herein in a manner analogous to those normally used, to prepare conventional oil-based drilling fluids. In one embodiment, a desired quantity of oleaginous fluid such as a base oil and a suitable amount of the surfactant described above are mixed together and the remaining components are added sequentially with continuous mixing. An invert emulsion may be formed by vigorous agitating, mixing or shearing the oleaginous fluid and the non-oleaginous fluid.

Other additives that may be included in the wellbore fluids disclosed herein include for example, wetting agents, organophilic clays, viscosifiers, fluid loss control agents, surfactants, dispersants, interfacial tension reducers, pH buffers, mutual solvents, thinners, thinning agents and cleaning agents. The addition of such agents should be well known to one of ordinary skill in the art of formulation drilling fluids and muds.

In some embodiments, the gels may form a filter cake or one component of a filter cake that forms along the wellbore as drilling progresses. The gels contained in the drilling fluid may be deposited along the wellbore throughout the drilling process, potentially strengthening the wellbore by stabilizing shale formations and other sections encountered while drilling. Improved wellbore stability may reduce the occurrence of stuck pipe, hole collapse, hole enlargement, lost circulation, and may improve well control.

Wellbore stability may also be enhanced by the injection of a low viscosity mixture of a lipophilic monomer and a crosslinking agent into formations along the wellbore. The mixture may then continue to react, strengthening the formation along the wellbore upon gellation of the mixture.

In other embodiments, the gels disclosed herein may aid in lifting solid debris from tubing walls and through the tubing annulus. Hard gels circulating through the drill pipe during drilling may scrape and clean the drill pipe, removing any pipe scale, mud, clay, or other agglomerations that may have adhered to the drill pipe or drill tubing. In this manner, the drill pipe may be maintained free of obstructions that could otherwise hinder removal of drilled solids from the drill pipe during drilling.

Enhanced Oil Recovery

Embodiments of the gels disclosed herein may be used to enhance secondary oil recovery efforts. In secondary oil recovery, it is common to use an injection well to inject a treatment fluid, such as water or brine, downhole into an oil-producing formation to force oil toward a production well. Thief zones and other permeable strata may allow a high percentage of the injected fluid to pass through only a small percentage of the volume of the reservoir, for example, and may thus require an excessive amount of treatment fluid to displace a high percentage of crude oil from a reservoir.

To combat the thief zones or high permeability zones of a formation, embodiments of the gels disclosed herein may be injected into the formation. Gels injected into the formation may partially or wholly restrict flow through the highly conductive zones. In this manner, the gels may effectively reduce channeling routes through the formation, forcing the treating fluid through less porous zones, and potentially decreasing the quantity of treating fluid required and increasing the oil recovery from the reservoir.

In other embodiments, gels may also be formed in situ within the formation to combat the thief zones. Lipophilic monomers may be injected into the formation, allowing the lipophilic monomers to penetrate further into the formation than if a gel was injected. The crosslinking agents may then be injected, causing the previously injected lipophilic monomers to crosslink within the formation. By forming the gels in situ in the formation, it may be possible to avert channeling that may have otherwise occurred further into the formation, such as where the treatment fluid traverses back to the thief zone soon after bypassing the injected gels as described above.

LCM Pills

As mentioned above, gels disclosed herein may be used as one component in a drilling fluid. The gels may form part of a filter cake, minimizing seepage of drilling fluids to underground formations and lining the wellbore. As another example, embodiments of the gels disclosed herein may be used as one component in loss circulation material (LCM) pills that are used when excessive seepage or circulation loss problems are encountered, requiring a higher concentration of loss circulation additives. LCM pills are used to prevent or decrease loss of drilling fluids to porous underground formations encountered while drilling.

In some embodiments, the crosslinking agent and lipophilic monomer/material may be mixed prior to injection of the pill into the drilled formation. The mixture may be injected while maintaining a low viscosity, prior to gel formation, such that the gel may be formed downhole. In other embodiments, the gelling material and crosslinking agent may be injected into the formation in separate shots, mixing and reacting to form a gel in situ (in the formation following injection of the LCM pill shots). In this manner, premature gel formation may be avoided.

For example, a first mixture containing a lipophilic monomer may be injected into the wellbore and into the lost circulation zone. A second mixture containing a crosslinking agent and/or pH modifier may be injected, causing the lipophilic monomer to crosslink in situ to the point that the gel expands in size. The expanded and hardened gel may plug fissures and thief zones, closing off the lost circulation zone.

Advantages of the current disclosure may include a non-aqueous gel with excellent ability to vary the gel properties based on a variety of applications. Adjustable gellation times, temperatures, and physical properties of the resulting gel may be selected for a particular desired application. The non-aqueous gel may be chosen to an appropriate hardness. Additionally, cardanol-based epoxy systems tend to be flexible, impact resistant, exhibit exceptional bond strength and low toxicity and volatility.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method of treating an earth formation comprising:
   injecting at least one lipophilic monomer in an oil-based solvent into the earthen formation, wherein the at least one lipophilic monomer is selected from epoxide-functionalized derivative of soybean oil, linseed oil, rapeseed oil, cashew nut shell oil; perilla oil, tung oil, oiticia oil, safflower oil, poppy oil, hemp oil, cottonseed oil, sunflower oil, high-oleic triglycerides, triglycerides of euphorbia plants, peanut oil, olive oil, olive kernel oil, almond oil, kapok oil, hazelnut oil, apricot kernel oil, beechnut oil, lupine oil, maize oil, sesame oil, grapeseed oil, lallemantia oil, castor oil, herring oil, sardine oil, menhaden oil, whale oil, and tall oil;
   injecting at least one crosslinking agent in an oil-based solvent into the earthen formation
      wherein the at least one crosslinking agent comprises at least one primary amine; and
   allowing at least one lipophilic monomer and at least one crosslinking agent to react in the earth formation,
   wherein the at least one lipophilic monomer and the at least one crosslinking agent together are present in an amount from about 0.5 to about 100 weight percent based on the total amount of oil-based solvent.

2. The method of claim 1, wherein a catalytic amount of tertiary amine is added.

3. The method of claim 1, wherein the at least one lipophilic monomer comprises derivatives of the extracts of cashew nut oil comprising structures with formula:

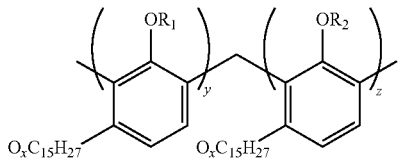

wherein x is an integer selected from 0 to 1;
wherein y is an integer selected from 0 to 5;
wherein z is an integer selected from 1 to 5;
wherein $R_1$ is selected independently from H, alkyl, alkenyl epoxide and derivatives thereof; and
wherein $R_2$ is selected independently from H, alkyl, alkenyl epoxide and derivatives thereof.

4. The method of claim 1, wherein the at least one crosslinking agent comprises at least one selected from aliphatic amines, aromatic amines, and cycloaliphatic amines.

5. The method of claim 4, wherein the aliphatic amines comprises at least one selected from triethylenetetramine (TETA), diethylenetriamine (DTA), polyetheramines, polyethyleneimines, and ethylenediamine (EDA).

6. The method of claim 1, wherein the lipophilic monomer and the crosslinking agent are injected simultaneously.

7. The method of claim 1, wherein the lipophilic monomer and the crosslinking agent are injected sequentially.

8. A method of making a non-aqueous gel comprising:
   providing a mixture of at least one lipophilic monomer and at least one crosslinking agent in an oil-based solvent,
      wherein the at least one lipophilic monomer is selected from an epoxide-functionalized derivative of soybean oil, linseed oil, rapeseed oil, cashew nut shell oil; perilla oil, tung oil, oiticia oil, safflower oil, poppy oil, hemp oil, cottonseed oil, sunflower oil, high-oleic triglycerides, triglycerides of euphorbia plants, peanut oil, olive oil, olive kernel oil, almond oil, kapok oil, hazelnut oil, apricot kernel oil, beechnut oil, lupine oil, maize oil, sesame oil, grapeseed oil, lallemantia oil, castor oil, herring oil, sardine oil, menhaden oil, whale oil, and tall oil; and
      wherein the at least one crosslinking agent comprises at least one primary amine; and
      wherein the at least one lipophilic monomer and the at least one crosslinking agent together are present in an amount from about 0.5 to about 100 weight percent based on the total amount of oil-based solvent in the mixture; and
   allowing the mixture to react to form a gel.

9. The method of claim 8, wherein a catalytic amount of a tertiary amine is added.

10. The method of claim 8, wherein the at least one lipophilic monomer comprises derivatives of the extracts of cashew nut oil comprising structures with formula:

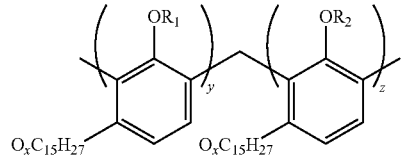

wherein x is an integer selected 0 to 1;
wherein y is an integer selected from 0 to 5;
wherein z is an integer selected from 1 to 5;
wherein $R_1$ is selected independently from H, alkyl, alkenyl epoxide and derivatives thereof; and
wherein $R_2$ is selected independently from H, alkyl, alkenyl epoxide and derivatives thereof.

11. The method of claim 8, wherein the at least one crosslinking agent comprises at least one selected from aliphatic amines, aromatic amines, and cycloaliphatic amines.

12. The method of claim 11, wherein the aliphatic amines comprises at least one selected from triethylenetetramine (TETA), diethylenetriamine (DTA), polyetheramines, polyethyleneimines, and ethylenediamine (EDA).

13. The method of claim 8, further comprising:
emplacing the mixture of the at least one lipophilic monomer, the at least one crosslinking agent, and the oil-based solvent in an earth formation.

14. A non-aqueous gel comprising:
at least one lipophilic monomer, wherein the at least one lipophilic monomer is selected from an epoxide-functionalized derivative of soybean oil, linseed oil, rapeseed oil, cashew nut shell oil; perilla oil, tung oil, oiticia oil, safflower oil, poppy oil, hemp oil, cottonseed oil, sunflower oil, high-oleic triglycerides, triglycerides of euphorbia plants, peanut oil, olive oil, olive kernel oil, almond oil, kapok oil, hazelnut oil, apricot kernel oil, beechnut oil, lupine oil, maize oil, sesame oil, grapeseed oil, lallemantia oil, castor oil, herring oil, sardine oil, menhaden oil, whale oil, and tall oil; and
at least one crosslinking agent, wherein the at least one crosslinking agent comprises at least one primary amine; and
an oil-based solvent, wherein the at least one lipophilic monomer and the at least one crosslinking agent together are present in an amount from about 0.5 to about 100 weight percent based on the total amount of oil-based solvent in the mixture.

15. The non-aqueous gel of claim 14, wherein the at least one lipophilic monomer comprises derivatives of cashew nut oil comprising structures with formula:

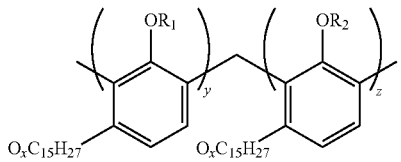

wherein x is an integer selected from 0 to 1;
wherein y is an integer selected from 0 to 5;
wherein z is an integer selected from 1 to 5;
wherein $R_1$ is selected independently from H, alkyl, alkenyl epoxide and derivatives thereof; and
wherein $R_2$ is selected independently from H, alkyl, alkenyl epoxide and derivatives thereof.

16. The non-aqueous gel of claim 14, wherein the at least one crosslinking agent comprises at least one selected from oil soluble polyetheramines, polyalkylamines, and combinations thereof.

17. The non-aqueous gel of claim 14, wherein the at least one crosslinking agent comprises at least one selected from aliphatic amines, aromatic amines, and cycloaliphatic amines.

18. The non-aqueous gel of claim 16, wherein the aliphatic amines comprises at least one selected from triethylenetetramine (TETA), diethylenetriamine (DTA), polyetheramines, polyethyleneimines, and ethylenediamine (EDA).

19. The non-aqueous gel of claim 14, wherein a weight ratio of the lipophilic monomer to the crosslinking agent ranges from about 1:2 to about 2:1.

20. The non-aqueous gel of claim 14, wherein the gel has a hardness in the range of approximately 300 to 2,000 psi.

21. The method of claim 1, wherein the at least one lipophilic monomer and the at least one crosslinking agent together are present in an amount from about 5 to about 100 weight percent based on the total amount of oil-based solvent in the mixture.

22. The method of claim 21, wherein the at least one lipophilic monomer and the at least one crosslinking agent together are present in an amount from about 20 to about 70 weight percent based on the total amount of oil-based solvent in the mixture.

23. The method of claim 22, wherein the at least one lipophilic monomer and the at least one crosslinking agent together are present in an amount from about 25 to about 65 weight percent based on the total amount of oil-based solvent in the mixture.

24. The non-aqueous gel of claim 14, wherein the at least one lipophilic monomer and the at least one crosslinking agent together are present in an amount from about 5 to about 100 weight percent based on the total amount of oil-based solvent in the mixture.

25. The non-aqueous gel of claim 24, wherein the at least one lipophilic monomer and the at least one crosslinking agent together are present in an amount from about 20 to about 70 weight percent based on the total amount of oil-based solvent in the mixture.

26. The non-aqueous gel of claim 25, wherein the at least one lipophilic monomer and the at least one crosslinking agent together are present in an amount from about 25 to about 65 weight percent based on the total amount of oil-based solvent in the mixture.

* * * * *